March 3, 1931.  E. W. LITTLE  1,794,718
BIRD CAGE LATCH
Filed March 13, 1928  3 Sheets-Sheet 1

Inventor
Earl W. Little,
By J. Stanley Bunch
Attorney

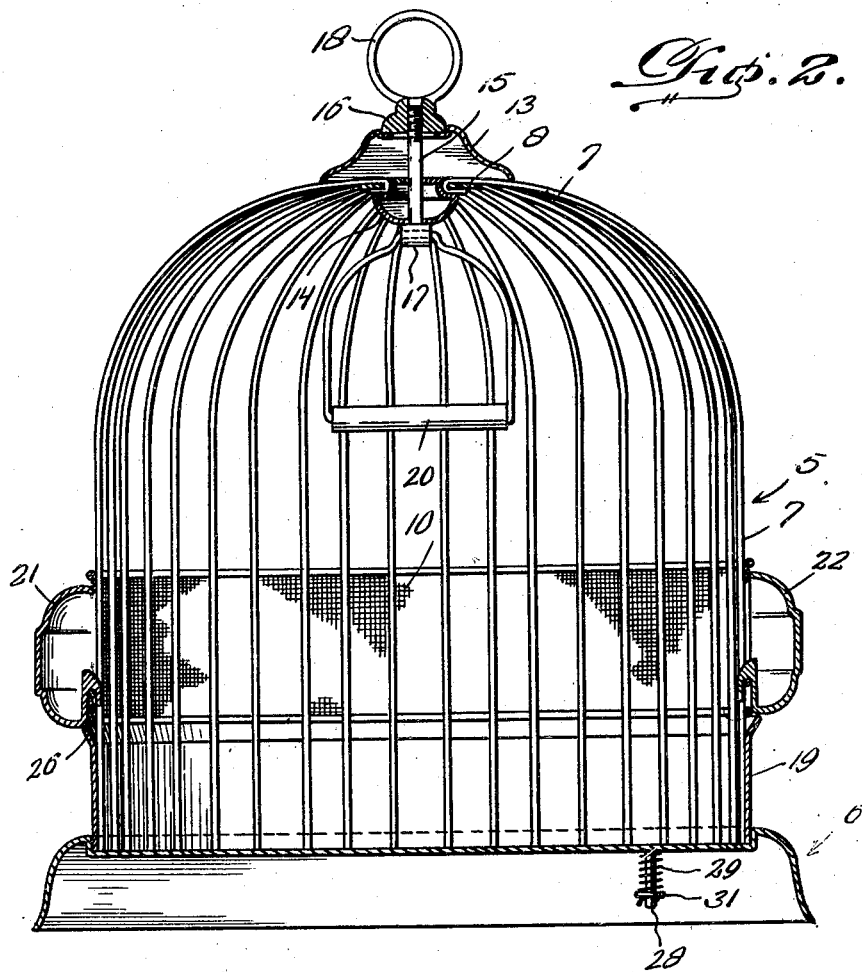
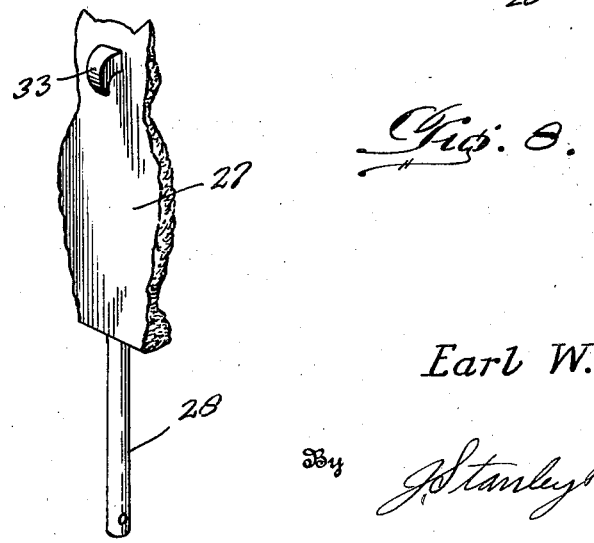

March 3, 1931.  E. W. LITTLE  1,794,718
BIRD CAGE LATCH
Filed March 13, 1928  3 Sheets-Sheet 3
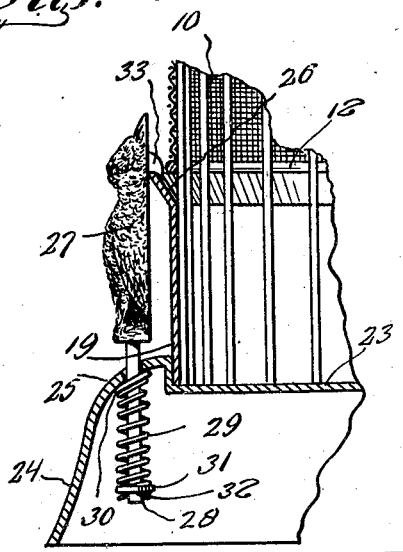
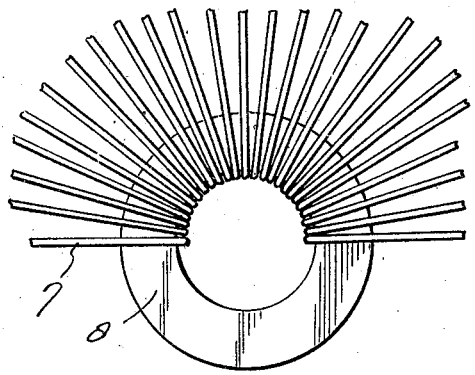
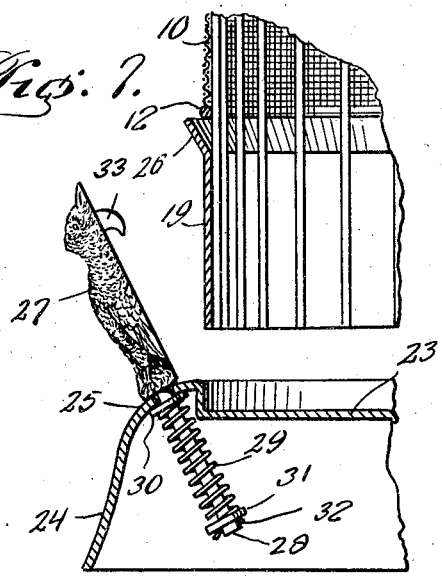
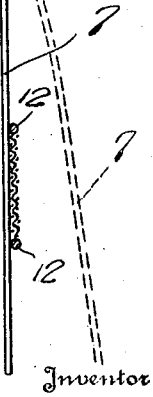
Inventor
*Earl W. Little,*
By *J. Stanley Burch*
Attorney Patented Mar. 3, 1931

1,794,718

UNITED STATES PATENT OFFICE

EARL W. LITTLE, OF INDIANAPOLIS, INDIANA

BIRD-CAGE LATCH

Application filed March 13, 1928. Serial No. 261,197.

This invention relates to bird cages, and the primary object of the invention is to generally simplify and improve the construction of cages of this kind so as to meet with all of the requirements for a successful commercial use.

A further object is to provide improved means for releasably latching the cage body and the base of the cage together.

A still further object is to provide an improved cage body of simple and durable construction.

Other and more specific objects will become apparent as the nature of the invention is better understood, and the same consists in the novel form, combination and arrangement of parts hereinafter more fully described, shown in the accompanying drawings and claimed.

In the drawings:

Figure 2 is a central vertical section thereof.

Figure 3 is an enlarged fragmentary detail plan view, showing the manner of connecting the upper ends of the vertical wires of the cage body together.

Figure 4 is a fragmentary detail vertical section, showing the manner of constructing the cage body.

Figure 6 is a fragmentary vertical section showing details of the means for releasably latching the cage body and the base of the cage together.

Figure 7 is a view somewhat similar to Figure 6, with the catch element released; and Figure 8 is an enlarged perspective view of one of the catch elements.

Figure 1:
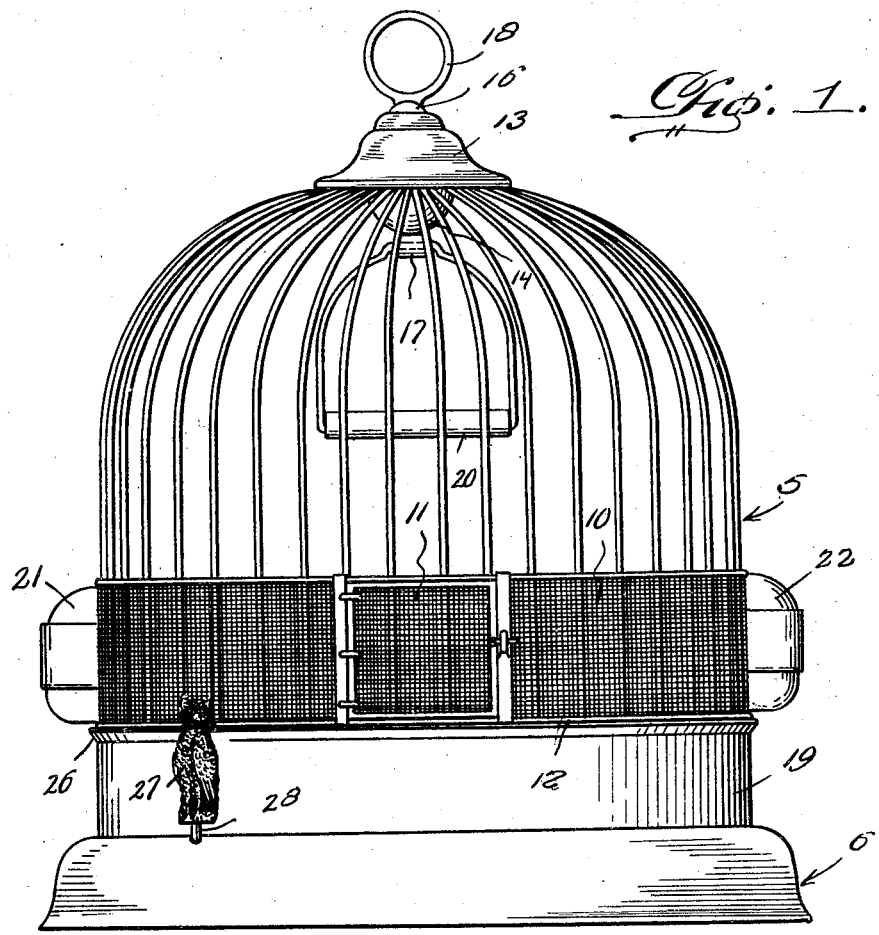
Figure 1 is a front elevational view of a bird cage embodying the present invention.
Figure 5:
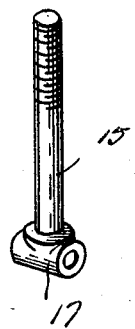
Figure 5 is a perspective view of the screw for suspending the swing and for receiving the cage-suspending loop.

Referring more in detail to the drawings, the cage comprises a body 5, and a removable base 6, both circular in form and with the top of the cage body 5 dome-shaped, as shown.

The body 5 is composed of a plurality of vertically extending wires 7, most of which reach from the top to the bottom of the cage body. The upper ends of the wires 7 extend and are grouped about a washer 8 and have terminal hooks 9 snugly engaged over the inner edge of the washer 8 as shown in Figures 2 to 4, inclusive, the wires 7 being soldered to the washer 8 to permanently connect them to the latter. A fine mesh screen band 10 encircles the cage body 5 near the bottom thereof to prevent the seed from being thrown out of the cage, the band 10 being secured to the wires 7 and having a door 11, as usual. Wires 12 encircle the cage body at the top and bottom of the screen band 10, and these wires 12 are welded to the wires 7 so as to keep the latter spaced apart the proper distance. As shown by dotted lines in Figure 4, the wires 7 are normally tensioned to extend downwardly and outwardly in diverging relation after they are hooked and soldered onto the washer 8, and when the wires 12 are applied the vertical wires 7 are sprung inwardly to the full line position of Figure 4 and there retained when the wires 12 are welded thereto. This brings the upper portions of the terminal hooks 9 tightly against the washer 8 so that when they are soldered to the latter, a very strong and durable construction is had wherein pulling of the vertical wires loose from the washer is effectively prevented. A suitable ornamental cap 13 is placed over the washer 8 and the adjacent portions of the wires, and this cap may be held in place in any suitable manner. As shown, a shell 14 is disposed against the underside of the washer 8, and this shell and the cap 13 are clamped together and retained in place by a screw 15 and a nut 16 threaded on the upper end of said screw, the head 17 on the lower end of the screw abutting the shell 14 and the nut 16 seating upon the cap 13. The nut 16 has a loop 18 for use in suspending the bird cage from a support. A sheet metal base member or band 19 encircles the lower ends of the wires 7 beneath the screen band 10, and this band 19 is welded to the wires 7, completing the cage body construction. The head of the screw 15 is shown in the form of an eye from which the swing 20 is suspended. The usual seed and water cups 21 and 22 are removably engaged with the lower wire 12.

The base 6 consists of a shallow tray 23 within which the lower end of the cage body snugly but removably fits, and a deep marginal wall 24 integral with and extending outward and downward from the rim of the tray 23 below the bottom of the latter, the upper portion 25 of the wall 24 sloping as shown clearly in Figures 6 and 7. The upper edge portion of the band 19 is flared outwardly as at 26, for a purpose which will presently become apparent.

To releasably latch the cage body 5 and the base 6 together, I provide a plurality of catch elements 27, carried by marginal wall 24 of the base 6 and spaced apart circumferentially about the latter. Each catch element 27 consists of an ornamental body, preferably in the form of the figure of a bird or animal, having a reduced depending rigid stem 28 loosely slidably extending through a hole in the sloping upper portion 25 of the wall 24 of the base, a compression spring 29 being disposed on the stem 28 with its ends respectively bearing against a washer 30 disposed on the stem 28 and against the underside of the wall portion 25 and a further washer 31 held on the lower end of the stem 28 by a cotter pin 32, or the like. The spring 29 normally expands to draw the lower end of the catch body down against the wall portion 25, and, due to the slope of the latter and the loose fit of the stem 28 in the hole of said wall portion 25, the catch body is swung out from the body of the cage to an outwardly tilted position as shown in Figure 7. It is thus apparent that when the catches are released, they will not interfere with the ready positioning of the lower end of the cage body within the tray, and they will especially not scratch or mar the surface finish of the cage body. A small hook 33 is provided on the upper end of the catch body adapted to engage over the flared upper edge portion 26 of the band 19 when the catch is raised against the action of the spring 29 and swung inwardly, as shown in Figure 6. With the several catches thus engaged with the band 19 and the springs 29 of the catches under compression, the cage body and the base of the cage will be effectively latched together, although they may be readily released, one from the other, by lifting the catch elements slightly.

Minor changes may be made without departing from the spirit and scope of the invention as claimed.

What I claim as new is:

1. In a bird cage, a body portion, a base cooperating therewith, a plurality of catch elements carried by said base, hooks on said catch elements, means on said body portion with which said hooks engage for suspending the base portion from said body portion, and spring members for clamping said hooks in engagement with the hook receiving means of the body portion, said catch elements resting in a vertical position when engaged with the body portion and moved and caused to assume a leaning position away from said body portion, by the tension of said springs, when released from the body portion.

2. A latch for the body portion and base member of a bird cage comprising a laterally tiltable and slidably mounted stem in the base portion, a hook extending therefrom and a compression spring thereon, and a keeper on the body portion for receiving the hook of said stem, the keeper being normally spaced above and rearwardly of the hook when the stem is in released position whereby the hook is automatically positioned out of the path of the body portion when released from the keeper.

In testimony whereof I affix my signature.

EARL W. LITTLE.